Aug. 31, 1965 R. W. DE MONTE 3,204,048

NEGATIVE IMPEDANCE REPEATERS FOR NON-LOADED LINES

Filed Sept. 29, 1961 2 Sheets-Sheet 1

INVENTOR
R. W. DeMONTE
BY R. B. Ardis
ATTORNEY

INVENTOR
R. W. DEMONTE
BY R. B. Ardis
ATTORNEY

3,204,048
NEGATIVE IMPEDANCE REPEATERS FOR NON-LOADED LINES

Robert W. De Monte, Berkeley Heights, N.J., assignor to Bell Telephone Laboratories, Incorporated, New York, N.Y., a corporation of New York Filed Sept. 29, 1961, Ser. No. 141,654
7 Claims. (Cl. 179—170)

This invention relates generally to negative impedances and more particularly to circuits which make use of negative impedances to reduce the loss of bilateral two-wire transmission lines.

As outlined by George Crisson in his article "Negative Impedances and the Twin 21-Type Repeater," which appeared at page 485 of the July 1931, issue of the Bell System Technical Journal, negative impedances fall into one or the other of two categories. The first of these includes negative impedances of the open-circuit stable or series type, while the other includes those of the short-circuit stable or shunt type. Both types of negative impedances may be conveniently produced by active devices known as negative impedance converters. A negative impedance converter produces a two-terminal impedance which is negatively related to a specific passive two-terminal terminating impedance over a predetermined frequency range and is open-circuit stable or short-circuit stable, depending upon the classification of the negative impedance produced. Illustrative of several successful negative impedance converters of both types are United States Patent 2,726,370, which issued December 6, 1955, to J. G. Linvill and R. L. Wallace, Jr., and United States Patent 2,878,325, which issued March 17, 1959, to J. L. Merrill, Jr.

In the past, use of negative impedances and negative impedance converters to reduce transmission line loss has been confined almost exclusively to inductively loaded transmission lines. Such lines have attenuation characteristics which are quite flat with frequency up to a predetermined cut-off frequency. Existing negative impedance devices tend to reduce loss in a substantially uniform manner over their effective frequency ranges. They tend, therefore, to be particularly well suited for use in connection with inductively loaded lines. A repeater made up of one or more negative impedances leaves the loss characteristic of an inductively loaded line nearly as flat with frequency as it found it.

While inductively loaded lines equipped with negative impedance repeaters have proved quite satisfactory for such voice frequency transmissions as ordinary telephone messages, their cut-off frequencies are usually too low to permit the rapid transmission of short pulse-type signals. For such purposes as the transmission of high speed data it is frequently desirable, therefore, to resort to the use of non-loaded transmission lines. Such lines, however, have attenuation characteristics which exhibit a steady rise with increasing frequency. To avoid a selective attenuation of the higher frequencies it is usually necessary to employ a combination of passive equalizing networks which bring the loss at low frequencies up to the level encountered at high frequencies and active repeaters which provide the desired amount of substantially flat gain over the frequency range of interest. Such a technique, however, is obviously inefficient in that it is wasteful of gain at the lower frequencies and requires the application of a greater amount of repeater power than is really needed.

A principal object of the invention is to introduce gain selectively to a bilateral non-loaded transmission line in such a fashion that no external passive equalization is needed to achieve an attenuation characteristic which is substantially flat with frequency.

A related object is to make maximum use of the available gain of a negative impedance repeater in reducing the loss of a bilateral two-wire non-loaded transmission line.

Still another object of the invention is to permit use of a transformer in a two-wire transmission line for impedance matching purposes without interfering with the transmission of direct currents.

In accordance with the present invention, these objects are obtained by connecting a two-terminal negative impedance device of the short-circuit stable type to be effectively in series with the line for frequencies at the low end of the frequency band of interest and to be effectively in shunt across the line for frequencies at the high end. Such an arrangement provides a repeater gain that is substantially complementary to the attenuation-versus-frequency characteristic of a non-loaded line and permits a relatively flat response characteristic to be achieved without any necessity for wasteful dissipation of power at low frequencies for purposes of equalization.

In a number of preferred embodiments of the invention, the negative impedance device is a negative impedance converter which is coupled to the line by a transformer having at least three mutually coupled windings. A pair of these windings are coupled in series aiding relation with one side of the two-wire line and a capacitor is connected from the junction between the pair of windings to the other side of the line. The negative impedance converter is connected across the third of the transformer windings. The capacitor functions in the sense of a switch acting as an open circuit at low frequencies to connect the converter effectively in shunt across the line. The maximum gain of the converter is made available to the line at the higher frequencies. This gain drops with decreasing frequency as the capacitor begins to insert impedance between the two sides of the line and, since the converter is of the short-circuit stable or shunt type, reaches its minimum as the low frequency end of the band is approached. Since there is no direct-current path across the line, there is no interference with the transmission of direct current. A transformer turns ratio other than unity may, moreover, be employed between the series windings of the transformer to adjust impedance levels on the two sides of the repeater.

A more complete understanding of the invention may be obtained from a study of the following detailed description. In the drawings.

Figure 1:
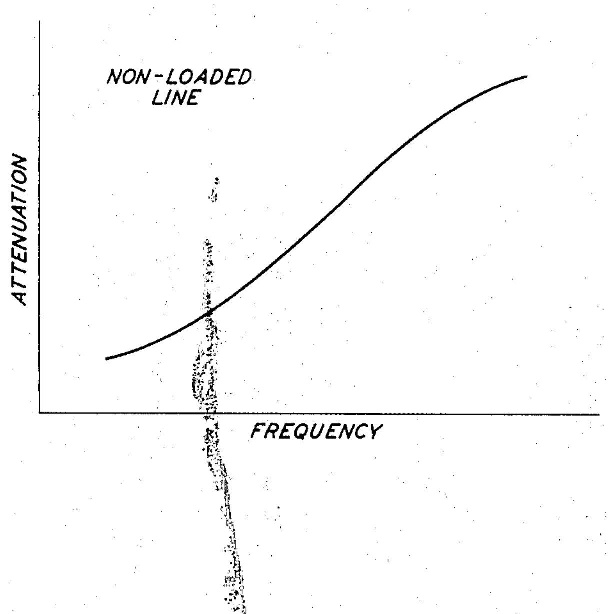
FIG. 1 illustrates the manner in which the attenuation characteristic of a non-loaded two-wire transmission line varies with frequency.

In general, the attenuation of a non-loaded two-wire telephone transmission line varies with frequency in the manner illustrated in FIG. 1. Phase, conductance, and susceptance vary in a similar manner. Unless equalized in some manner, the differences between these parameters at different frequencies result in distortion of signals transmitted over the line, particularly if they are broadband in nature. Use of ordinary repeaters to reduce the attenuation does not improve the situation appreciably for the reason that the shape of the curve is not basically altered.

Figure 2:
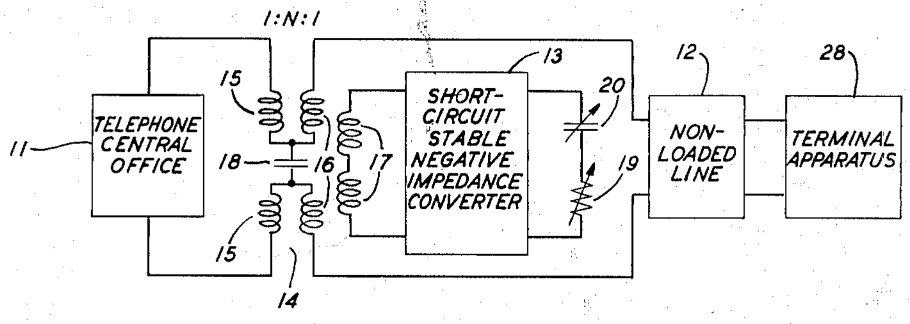
FIG. 2 is a combination schematic and block diagram illustrating a specific embodiment of the invention.

As has already been indicated, the present invention introduces gain into a non-loaded line in a highly selective manner, resulting in an ultimate attenuation or loss characteristic that is substantially flat with frequency over a wide range of frequencies. The characteristic is, moreover, flat to a frequency considerably in excess of the cut-off frequencies of typical inductively loaded lines. FIG. 2 illustrates, in the context of the telephone plant, the manner in which the invention brings about such an improvement.

In FIG. 2, an ordinary telephone central office 11 is coupled to a balanced non-loaded two-wire transmission line 12, with gain inserted by a bilateral negative impedance repeater embodying the invention. In the repeater, a negative impedance converter of the short-circuit stable or shunt type is coupled to the line by a transformer 14 having three mutually coupled windings 15, 16, and 17. As indicated, these windings have a turns ratio of $1:N:1$, respectively. Each winding is split into two sections for balance and the upper sections of the first two windings 15 and 16 are connected in series with each other on one side of the line. The lower sections of the same two windings are connected in series with each other on the other side of the line. All four winding sections are in series aiding relation with one another. A negative impedance converter 13 is connected across both sections of the third winding 17 of transformer 14. As illustrated, transmission line 12 is terminated by suitable terminal apparatus 28 which may, by way of example, take the form of a telephone set or data transmitting and receiving equipment.

In accordance with an important feature of the invention, the gain of negative impedance converter 13 is inserted selectively with respect to frequency by the action, in cooperation with transformer 14, of a capacitor 18 connected across the line from the junction between the upper sections of windings 15 and 16 to the junction between the lower sections of the same windings. To provide a close match to the impedance of central office 11, converter 13 is terminated by a variable resistor 19 connected in series with a small variable capacitor 20. The amount of resistance and capacity is fixed to match the characteristics of office 11 and terminal equipment 28.

Figure 3:
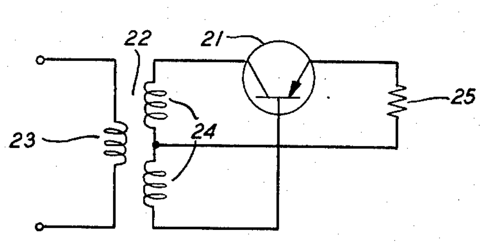
FIG. 3 is a simplified schematic diagram of a negative impedance converter of the short-circuit stable type.

Although any negative impedance converter of the short-circuit stable type may be used to advantage in the embodiment of the invention illustrated in FIG. 2, the one shown diagrammatically in FIG. 3 is a particularly simple example and serves to illustrate the principles involved. The alternating-current circuit only is illustrated, the direct-current biasing circuitry being eliminated for the sake of simplicity. As shown, a transistor 21 is connected in the common-base configuration and has a positive feedback path provided by a transformer 22. Transformer 22 has one winding 23 providing the two external terminals of the converter and a second winding 24 providing the actual feedback path. Winding 24 is connected between the collector and base electrodes of transistor 21, while a terminating impedance 25 is connected from the emitter electrode to the midpoint of winding 24.

The common-base transistor stage in FIG. 3 has an emitter impedance which is very low, a collector impedance which is much higher, and a current ratio between emitter and collector which is very nearly unity. When a potential is applied to external winding 23 of the converter, a current is coupled to terminating impedance 25, developing a potential across it. This potential produces an emitter current in transistor 21. Since the collector current of transistor 21 is in phase with and substantially equal to the emitter current, the output current thereby applied to external winding 23 is reversed in phase with respect to the voltage originally applied to winding 23. The magnitude of this output current is determined primarily by terminating impedance 25 and the impedance presented between the two terminals of external winding 23 by the converter is essentially the negative of terminating impedance 25. This negative impedance is of the short-circuit stable type in that the circuit will not break into self-oscillation if the terminals of external transformer winding 23 are short circuited.

Figure 4:
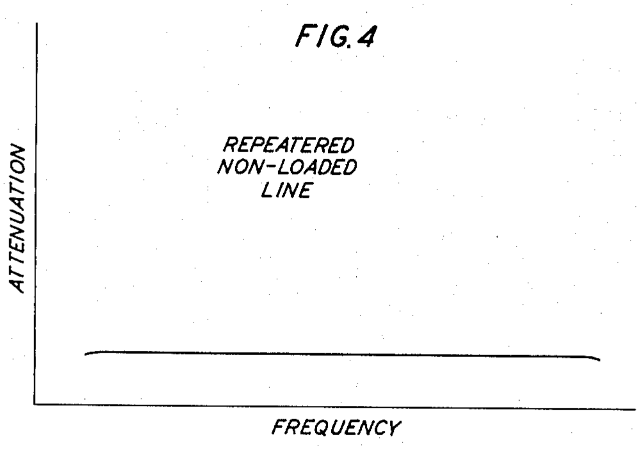
FIG. 4 illustrates the attenuation-versus-frequency characteristic of a non-loaded two-wire transmission line equipped with one or more repeaters in accordance with the present invention.

The attenuation-versus-frequency characteristic of the repeatered non-loaded line shown in FIG. 2 is illustrated in FIG. 4. As shown, loss is relatively flat over a very wide range of frequencies. In a sense, capacitor 18 in FIG. 2 acts as a frequency-sensitive switch, presenting substantially an open circuit at the lower end of the voice frequency spectrum and substantially a short circuit at the higher frequencies. A negative impedance of the short-circuit stable type provides gain most effectively when connected in shunt across a transmission line. In accordance with the invention, this type of connection is found only at the high frequency end of the spectrum in the embodiment of the invention shown in FIG. 2, where capacitor 18 is substantially a short circuit. The gain of converter 13 is, therefore, concentrated predominantly where it is most needed, at the high frequencies. At the low frequency end of the spectrum, the illustrated arrangement of transformer 14 and capacitor 18 leaves converter 13 connected effectively in series with the line, resulting in minimum gain. The converter remains stable, however, because of the relatively low impedance of the converter winding 17 of the three-winding coupling transformer 14. At intermediate frequencies, the transition is gradual, yielding the substantially flat loss characteristic shown in FIG. 4.

The turns ratio of transformer 14 in the embodiment of the invention illustrated in FIG. 2 is chosen primarily by the level of transmission loss desired of the system. As indicated, a turns ratio of substantially unity is preserved between windings 15 and 17. That between winding 16 and the other two windings, however, may be greater than unity if minimum loss is the desired result or less than unity if system requirements dictate a higher level of loss. In either instance, of course, the loss remains substantially flat over a wide range of frequencies. A turns ratio greater than unity has the additional advantage of permitting smaller components to be used in the converter terminating network.

Figure 5:
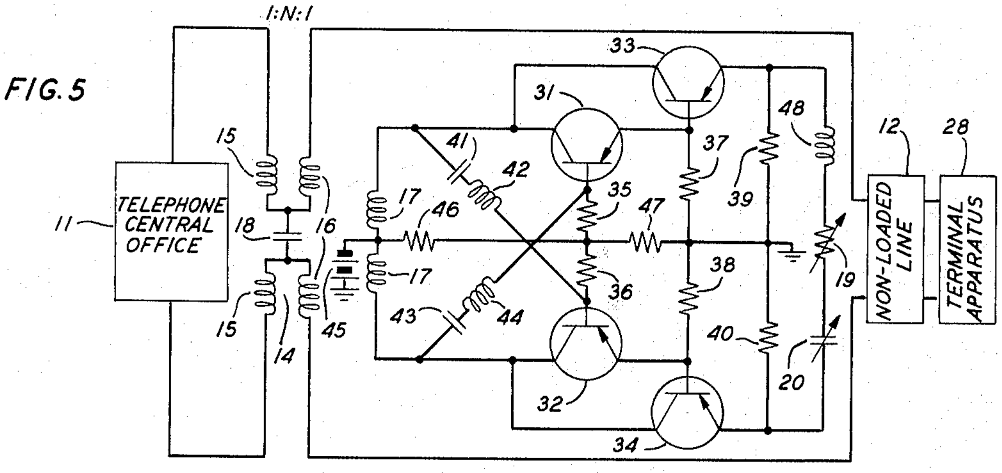
FIG. 5 is a schematic diagram illustrating in full a specific embodiment of the invention.

A more detailed version of the embodiment of the invention shown in FIG. 2 is illustrated in FIG. 5. As before, a standard telephone central office 11 is connected to a balanced two-wire telephone transmission line 12 by a negative impedance repeater employing the principles of the present invention to insert gain into the frequency spectrum primarily at the frequencies where it is most needed and thereby achieve a substantially flat attenuation-versus-frequency characteristic.

FIG. 5, the arrangement of transformer 14 and capacitor 18 is as in FIG. 2, with capacitor 18 forming substantially a short circuit for frequencies at the high end of the frequency band of interest and substantially an open circuit for frequencies at the low end. As a result, the short-circuit stable negative impedance converter employed is connected substantially in shunt across the line for high frequencies and substantially in series with the line for low frequencies, yielding the loss-versus-frequency characteristic illustrated in FIG. 4.

The negative impedance converter in FIG. 5 is of the push-pull type in order to avoid any necessity for the use of an additional transformer to provide positive feedback as in FIG. 3, to provide cancellation of even harmonic distortion products, and to provide greater power output. The active elements in the converter are four transistors 31, 32, 33, and 34. These transistors are connected in pairs in the so-called compound arrangement disclosed in United States Patent 2,663,806, which issued December 22, 1958, to S. Darlington, in order to assure transistor current amplification factors more nearly equal to unity than those of single transistors, and to provide substantially constant gain regardless of variations in individual transistor characteristics. In the context of the negative impedance converter shown, however, each transistor pair operates essentially as a single transistor.

As illustrated, the collector electrodes of transistors 31 and 33 are connected directly together, as are those of transistors 32 and 34. The emitter electrode of transistor 31 is connected to the base electrode of transistor 33 and the emitter electrode of transistor 32 is connected to the base electrode of transistor 34. A first pair of like resistors 35 and 36 are connected in series between the base electrodes of transistors 31 and 32, while a pair of like resistors 37 and 38 are connected in series between the base electrodes of transistors 33 and 34. A third pair of like resistors 39 and 40 are connected between the collector electrodes of transistors 33 and 34. The junction of resistors 37 and 38 and that of resistors 39 and 40 are both grounded.

On the left-hand side of the transistors in FIG. 5, the two portions of line transformer winding 17 are connected in series between the collector electrodes of transistors 31 and 32. To provide positive feedback without the use of a transformer, the collector electrode of transistor 31 is cross-coupled to the base electrode of transistor 32 by the series combination of a blocking capacitor 41 and an inductor 42, and the collector electrode of transistor 32 is cross-coupled in a similar manner to the base electrode of transistor 31 by the series combination of a blocking capacitor 43 and an inductor 44. Inductors 42 and 44 are arranged on a common core so that they have a mutual inductance in addition to their self inductance. The center tap of winding 17 is connected to a negative source of direct voltage 45 and the biasing circuitry is completed by a resistor 46 connected from the center tap of winding 17 to the junction of resistors 35 and 36 by a resistor 47 connected from the latter junction to the junction between resistors 37 and 38. Finally, the terminating network made up of resistor 19 and capacitor 20 is connected between the emitter electrodes of transistors 33 and 34, with an inductor 48 connected in series with the network to balance out the leakage inductance of transformer 14 for stability purposes.

In the operation of the negative impedance converter employed in FIG. 5, the several base resistors 35, 36, 37, and 38 serve to fix the amount of load carried by each transistor and to protect the transistors by limiting peak currents during voltage surges on the line. These resistors, plus resistors 39, 40, 46, and 47, function to provide operating biases for all transistors. The value of resistors 39 and 40 is made large enough in comparison with the terminating network so as not to affect the functions of that network.

The following element values for the embodiment of the invention illustrated in FIG. 5 are listed by way of example:

| | | |
|---|---|---|
| Capacitor **18** | microfarads | 1.06 |
| Resistors **35** and **36** | ohms | 15,000 |
| Resistors **37** and **38** | do | 43,000 |
| Resistors **39** and **40** | do | 3,900 |
| Capacitors **41** and **43** | microfarad | .0487 |
| Inductors **42** and **44** | millihenries | 40 |
| Voltage source **45** | volts | —48 |
| Resistor **46** | ohms | 6,800 |
| Resistor **47** | do | 43,000 |
| Inductor **48** | millihenries | 1.25 |

The turns ratio of winding 16 in transformer 14 to the other windings can be varied by tapping up or down on winding 16 from line 12 in symmetrical fashion. The terminating network connected between the emitter electrodes of transistors 33 and 34 may be made up of all fixed constants as illustrated or may, alternatively, be made up of variable elements or a number of fixed elements which may be switched into or out of the network to provide a desired resistance-capacity combination.

In addition to providing simultaneous gain and equalization in a non-loaded bilateral two-wire transmission line in the manner described, the negative impedance repeater illustrated in FIG. 5 is capable of transmitting direct-current telephone signaling impulses with a minimum of distortion. The ratio of the inductance of transformer 14 to the capacity of capacitor 18 is such as to present a good resistance match to the impedance of transmission line 12. As a result, a good pulse shape is received at the central office 11 from line 12 in spite of the relatively large capacitor 18 connected across the line.

It is to be understood that the above-described arrangements are illustrative of the application of the principles of the invention. Numerous other arrangements may be devised by those skilled in the art without departing from the spirit and scope of the invention.

What is claimed is:

1. In combination with a bilateral two-wire transmission line carrying a predetermined band of frequencies, a negative impedance converter presenting a two-terminal negative impedance of the short-circuit stable type between a pair of terminals, a transformer having at least three mutually coupled windings, means connecting a pair of said windings in series aiding relation with one side of said line, means connecting a third of said windings across said pair of terminals of said negative impedance converter, and a capacitor connected from the junction between said pair of windings and the other side of said line, whereby the negative impedance presented to said third winding by said converter appears effectively in series with said line for frequencies at the low frequency end of said band and effectively in shunt across said line for frequencies at the high frequency end of said band.

2. In combination with a bilateral two-wire transmission line balanced with respect to ground and carrying a predetermined band of frequencies, a negative impedance converter presenting a two-terminal negative impedance of the short-circuit stable type between a pair of terminals, a transformer having at least three mutually coupled windings, a pair of said windings each being split into two sections, means connecting one section of each of said pair of windings in series aiding relation with one side of said line, means connecting the other section of each of said pair of windings in series aiding relation with the other side of said line, means connecting a third of said windings across said pair of terminals of said negative impedance converter, and a capacitor connected from the junction between said winding sections in series with one side of said line to the junction between said winding sections in series with the other side of said line, whereby the negative impedance presented to said third winding by said converter appears effectively in series with said line for frequencies at the low frequency end of said band and effectively in shunt across said line for frequencies at the high frequency end of said band.

3. In combination with a two-wire transmission line carrying a predetermined band of frequencies, a two-terminal impedance device, a transformer having at least three mutually coupled windings, means connecting a pair of said windings in series with one side of said line, means connecting a third of said windings across said impedance device, and a capacitor connected from the junction between said pair of windings to the other side of said line, whereby the impedance presented to said third winding by said impedance device appears effectively in series with said line for frequencies at the low frequency end of said band and effectively in shunt across said line for frequencies at the high frequency end of said band.

4. In combination, a telephone central office, a non-loaded bilateral two-wire telephone transmission line, and a bilateral repeater connected between said central office and said line, said repeater comprising a two-terminal negative impedance of the short-circuit stable type, a transformer having at least first, second, and third mutually coupled windings, means connecting said first and second windings in series aiding relation with one side of said line with said first winding being connected to said central office and said second winding being connected to said line, means connecting said negative impedance across said third winding, and a capacitor connected from the junction between said first and second windings to the other side of said line, said first, second, and third windings having a turns ratio of 1:$N$:1, respectively.

5. A combination in accordance with claim 4 in which said negative impedance is a negative impedance converter terminated by a network comprising a resistor and a capacitor in series.

6. In combination, a telephone central office, a nonloaded bilateral two-wire telephone transmission line balanced with respect to ground, and a bilateral repeater connected between said central office and said line, said repeater comprising a two-terminal negative impedance of the short-circuit stable type, a transformer having at least first, second, and third mutually coupled windings, said first and second windings each being split into a pair of sections, means connecting a section of each of said first and second windings in series aiding relation with one side of said line, means connecting the other section of each of said first and second windings in series aiding relation with the other side of said line, means conecting said negative impedance across said third winding, and a capacitor connected from the junction between said winding sections in series with one side of said line to the junction between said winding sections in series with the other side of said line, said first, second, and third windings having a turns ratio of 1:$N$:1, respectively.

7. A combination in accordance with claim 6 in which said negative impedance is a negative impedance converter terminated by a network comprising a resistor and a capacitor in series.

References Cited by the Examiner

UNITED STATES PATENTS 2,747,165 5/56 Fuller ---------------- 333—24

FOREIGN PATENTS 738,319 10/55 Great Britain.

ROBERT H. ROSE, *Primary Examiner.*

WALTER L. LYNDE, *Examiner.*